(12) United States Patent
Allan

(10) Patent No.: US 7,472,168 B2
(45) Date of Patent: Dec. 30, 2008

(54) METHOD FOR DYNAMICALLY ASSIGNING AND DISPLAYING CHARACTER SHORTCUTS ON A COMPUTING DEVICE DISPLAY

(75) Inventor: Kevin David Allan, Seattle, WA (US)

(73) Assignee: MOBUI Inc., Redmond, WA (US)

( * ) Notice: Subject to any disclaimer, the term of this patent is extended or adjusted under 35 U.S.C. 154(b) by 1112 days.

(21) Appl. No.: 10/684,228

(22) Filed: Oct. 10, 2003

(65) Prior Publication Data
US 2004/0133851 A1    Jul. 8, 2004

Related U.S. Application Data

(60) Provisional application No. 60/417,814, filed on Oct. 10, 2002.

(51) Int. Cl.
G06F 15/16    (2006.01)
G06F 17/00    (2006.01)
G06F 3/14     (2006.01)

(52) U.S. Cl. .................... 709/217; 715/206; 715/207; 715/208; 715/864

(58) Field of Classification Search ......... 709/217–219, 709/222, 200; 715/501.1, 513, 523, 206–208, 715/864; 379/900, 906
See application file for complete search history.

(56) References Cited

U.S. PATENT DOCUMENTS

| | | | |
|---|---|---|---|
| 5,387,042 A | | 2/1995 | Brown |
| 5,761,683 A * | | 6/1998 | Logan et al. ................ 715/206 |
| 5,799,063 A * | | 8/1998 | Krane ...................... 379/88.17 |
| 5,809,317 A * | | 9/1998 | Kogan et al. ................ 715/236 |
| 6,034,689 A * | | 3/2000 | White et al. ................ 715/854 |
| 6,211,874 B1 * | | 4/2001 | Himmel et al. ............. 715/781 |
| 6,272,680 B1 * | | 8/2001 | Gaughan et al. ............ 725/112 |
| 6,812,954 B1 * | | 11/2004 | Priestman et al. ......... 348/14.01 |
| 6,822,664 B2 * | | 11/2004 | Vale .......................... 715/864 |
| 6,832,353 B2 * | | 12/2004 | Itavaara et al. ............. 715/744 |
| 6,952,799 B2 * | | 10/2005 | Edwards et al. .......... 715/501.1 |
| 7,184,024 B2 * | | 2/2007 | Eftekhari ..................... 345/169 |
| 7,225,410 B2 * | | 5/2007 | Kimmo et al. ............. 715/748 |
| 7,251,774 B2 * | | 7/2007 | Sunata .................... 715/500.1 |
| 7,286,145 B2 * | | 10/2007 | Sunata ....................... 345/671 |
| 7,315,988 B2 * | | 1/2008 | Cragun et al. .............. 715/864 |
| 7,379,965 B2 * | | 5/2008 | Sherwood et al. .......... 709/203 |
| 2002/0032699 A1 * | | 3/2002 | Edwards et al. ............. 707/513 |
| 2002/0059333 A1 | | 5/2002 | Tribbeck |

(Continued)

OTHER PUBLICATIONS

"The Future of WAP" Wigley, Andy; 'Online! 2000, WROX Conferences, www.topxml.com/conference/wrox/wireless_2000/andy.pdf.
HTML 4.01 Specification; Ragget, Dave; 'Online!, Dec. 24, 1999; www.w3.org/TR/1999/REC-htm1401-19991224.

*Primary Examiner*—J. Bret Dennison
(74) *Attorney, Agent, or Firm*—Schwabe, Williamson & Wyatt, P.C.

(57) ABSTRACT

The present invention is directed to the automatic provision of "bubble links" for accessing data services and selectable elements in a GUI of a computing device. The present invention includes the provision of a renderer to a computing device equipped to automatically present bubble links associated with input characters to a user of the computing device to improve the ease of use in accessing data services and selectable elements using the computing device.

18 Claims, 6 Drawing Sheets

U.S. PATENT DOCUMENTS

| | | |
|---|---|---|
| 2002/0085042 A1 | 7/2002 | Matthews |
| 2002/0107888 A1* | 8/2002 | Chiu et al. .................. 707/513 |
| 2002/0160790 A1* | 10/2002 | Schwartz et al. ............ 455/456 |
| 2003/0040341 A1* | 2/2003 | Casais ........................ 455/566 |
| 2003/0152203 A1* | 8/2003 | Berger et al. ............. 379/93.24 |
| 2004/0044747 A1* | 3/2004 | Trevor et al. ................ 709/217 |
| 2004/0133851 A1* | 7/2004 | Allan ....................... 715/501.1 |
| 2004/0177148 A1* | 9/2004 | Tsimelzon, Jr. ............. 709/227 |
| 2004/0199871 A1* | 10/2004 | Lee ............................ 715/513 |
| 2004/0205156 A1* | 10/2004 | Aarts et al. ................. 709/218 |
| 2004/0205484 A1* | 10/2004 | Pennington et al. ...... 715/500.1 |
| 2005/0022140 A1* | 1/2005 | Vale ........................... 715/864 |
| 2005/0081149 A1* | 4/2005 | Vale ........................... 715/526 |
| 2006/0265653 A1* | 11/2006 | Paasonen et al. ............. 715/704 |
| 2007/0067333 A1* | 3/2007 | Cho et al. ................... 707/102 |
| 2007/0180066 A1* | 8/2007 | Sherwood et al. ........... 709/220 |
| 2007/0180432 A1* | 8/2007 | Gassner et al. .............. 717/136 |

* cited by examiner

METHOD FOR DYNAMICALLY ASSIGNING AND DISPLAYING CHARACTER SHORTCUTS ON A COMPUTING DEVICE DISPLAY

CROSS-REFERENCE TO A RELATED APPLICATION

This application claims the benefit of U.S. Provisional Application No. 60/417,814, filed on Oct. 10, 2002, and entitled METHOD FOR DYNAMICALLY ASSIGNING AND DISPLAYING NUMERIC SHORTCUTS ON A WIRELESS MOBILE DEVICE DISPLAY, the subject matter of which is incorporated herein by reference.

FIELD OF THE INVENTION

The present invention relates to the field of computer communications. More specifically, the present invention relates the provision of a user interface accessing hypertext links using a computing device.

BACKGROUND OF THE INVENTION

Most software applications on computing devices are controlled via a graphical user interface ("GUI"). The GUI displays selectable elements, such as hypertext links and the like, on a display device for a user to view and select. Typically, a user uses a pointing device, such as a mouse, stylus or track ball, to select the selectable elements within the GUI. However, not all users are able to use pointing devices, and not all computing devices provide such pointing devices. In particular, on many compact devices such as personal data assistants ("PDA") and cellular telephones, such pointing devices are unavailable, or inconvenient. For these reasons there is a need to access selectable elements in a GUI without a pointing device. Numerous conventional methods developed for selecting selectable elements in a GUI without a pointing device have been developed.

One early software application for browsing hypertext documents (with selectable elements, i.e., links) is the LYNX program. LYNX used two methods for accessing links without a pointing device. The first LYNX method had a user move sequentially through each link using a cursor key. Users would then actuate the "enter" key to select a link that was highlighted. However, this first method remains undesirable as it requires multiple key strokes to activate a specific link, and still further requires a user to constantly view the GUI while locating a specific link. In a GUI with a large number of selectable elements, such a method may deter a user from using the system.

Another method of accessing links within the LYNX software is by turning on a numbering system such that each link in the document is statically paired with a number within the body of the document. However, the static numbering method of accessing hypertext links is both aesthetically unappealing and disturbs the layout and appearance of the contents of the hypertext document. The numbers tend to clutter the GUI with unnecessary information and thus reduce the overall ease of use for the consumer. Furthermore, in small displays, such as those on portable computing devices, the numbers use up valuable display space that could be used to store and display meaningful content.

Thus, a great need exists for a method of selecting selectable elements in a GUI without a pointing device. There is a further need for such a method to be both efficient and user friendly under the context of a limited number of input keys.

BRIEF DESCRIPTION OF DRAWINGS

The present invention will be described by way of exemplary embodiments, but not limitations, illustrated in the accompanying drawings in which like references denotes similar elements, and in which.

DETAILED DESCRIPTION OF EMBODIMENTS OF THE INVENTION

The detail description which follows is represented largely in terms of processes and symbolic representations of operations by conventional computing components including processors, memory storage devices for the processors, connected display devices, and input devices, all of which are well known in the art. The processes and operations may utilize conventional computing components in the heterogeneous distributed computing environment, including remote storage servers, network servers and memory storage devices; such processes, devices and operations also being known to those skilled in the art and others.

Figure 2:
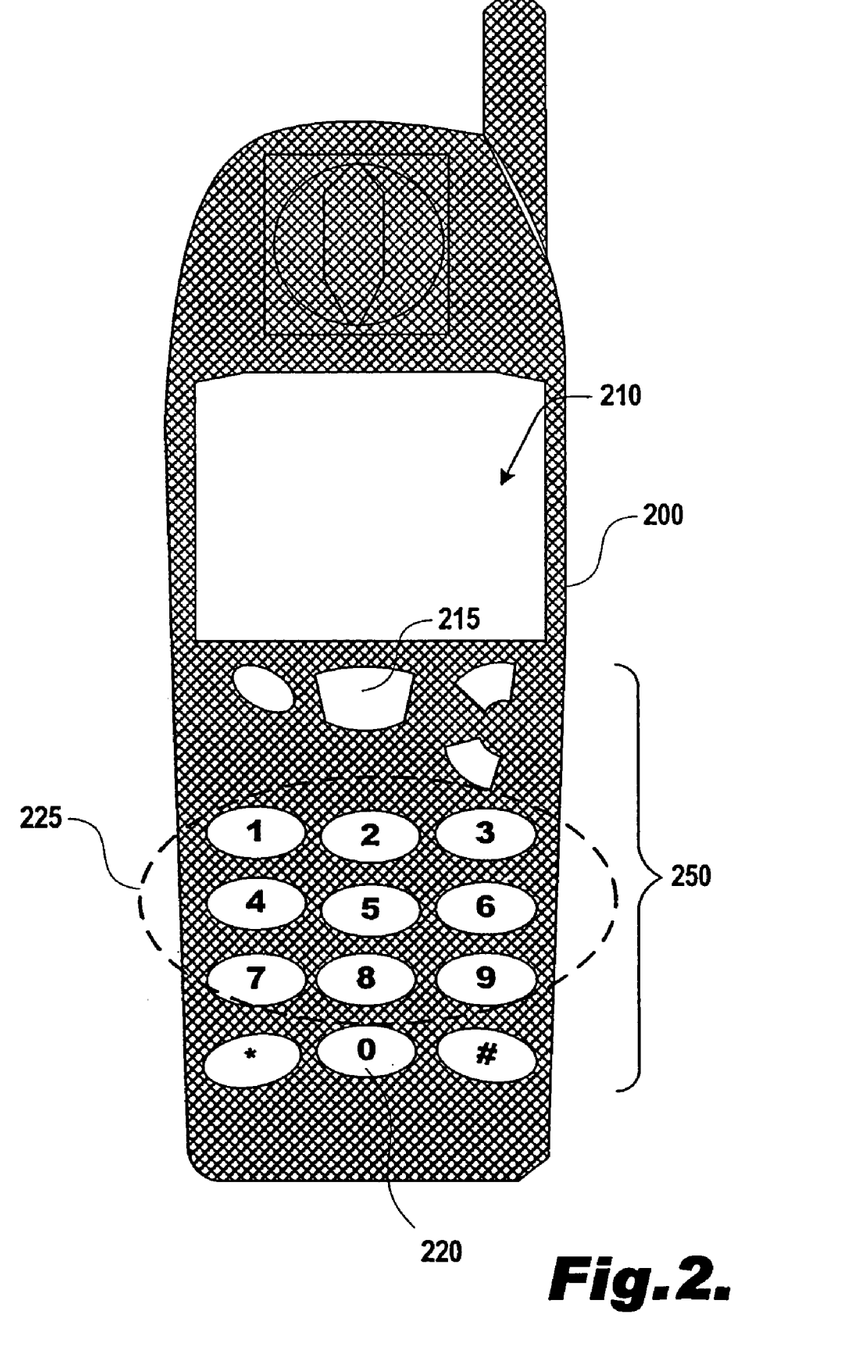
FIG. 2 is a representation of an exemplary phone computing device interface as used in one embodiment of the present invention.

Bubble links allow users to select selectable elements in a GUI by pressing the corresponding character of a computing device's keyboard. In one exemplary embodiment of the present invention, the computing device is a cellular telephone 200 with a display screen 210 and a numeric keypad 250. The bubble links on such an embodiment of the present invention may include bubble links with the numeric characters "1-9" displayed next to up to nine selectable elements displayed on the cellular telephone's display. Accordingly, the selectable elements on the cellular phone's display 210 would be selected once the numeric character corresponding to the bubble link in the cellular telephone's display is selected from the numeric keypad 250.

Figure 1:
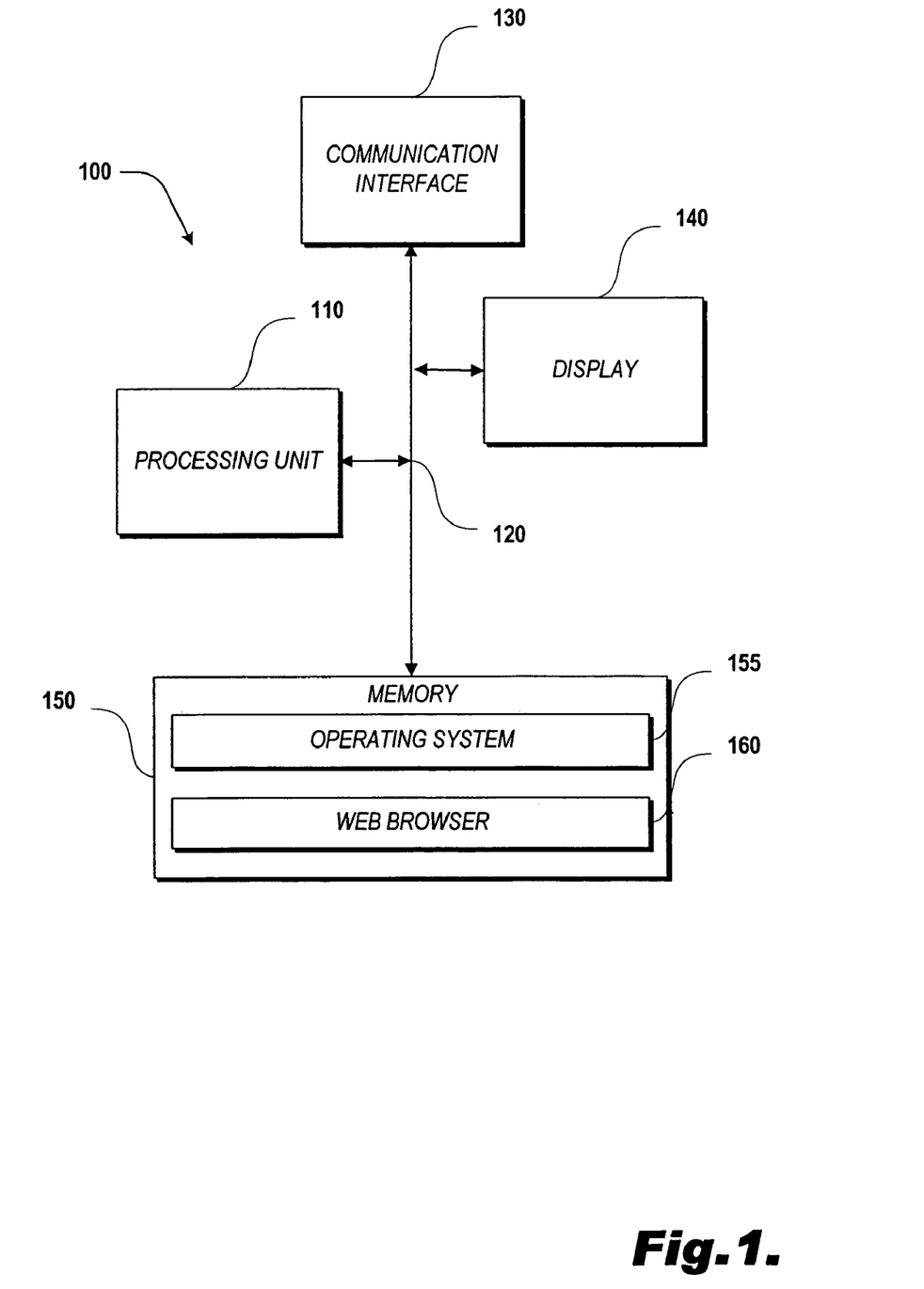
FIG. 1 is a block diagram of a computing device that provides an exemplary operating environment for an embodiment of the present invention.

FIG. 1 illustrates an exemplary computing device suitable for use in the present invention. Those of ordinary skill in the art and others will appreciate that the computing device 100 may include many more components than those shown in FIG. 1. However, it is not necessary that all of these generally conventional components be shown in order to disclose an enabling embodiment for practicing the present invention. As shown in FIG. 1, the computing device 100 includes a network interface 130 for connecting to remote devices. Those of ordinary skill in the art will appreciate that the network interface 130 includes the necessary circuitry for such a connection, and is also constructed for use with appropriate protocols for such a connection.

The computing device 100 also includes a processing unit 110, a display 140 and a memory 150 all interconnected along with the network interface 130 via a bus 120. The memory 150 generally comprises a random access memory ("RAM"), a read-only memory ("ROM") and a permanent mass storage device, such as a disk drive. The memory 150 stores an operating system 155 and a web browser 160. It will be appreciated that these software components may be loaded from a computer readable medium into memory 150 of the client device 100 using a drive mechanism (not shown) associated with the computer readable medium, such as a floppy, tape or DVD/CD-rom drive or the network interface 130.

Although an exemplary computing device 100 has been described that generally conforms to a conventional computing device, those of ordinary skill in the art will appreciate that a computing device 100 may be any of a great number of computing devices capable of communicating with remote devices. In various embodiments of the present invention, the computing device 100 may be a cellular phone, PDA, general purpose computing device and the like.

FIG. 2 depicts one exemplary computing device 100 for use in the present invention in the form of a cellular telephone 200. The cellular telephone 200 includes a phone display 210 and a keypad 250. The keypad includes numeric keys 225, as well as two special keys. The first special key is a scroll key 215 for traversing data displayed in the phone display 210. The second special key is a dynamic link key 220, which in FIG. 2 is shown as the "0" key 220 in the keypad 250. Also shown in FIG. 2 are character keys 225 (i.e., number keys 1-9) which correspond to characters that are dynamically associated with selectable elements (e.g., icons, file names, program names, links to files, form fields, etc.) or links (e.g., text links, image links, hidden links, image map links, etc . . . ) displayed in the phone display 210. The dynamic association and rendering of links with associated characters is further described below with regard to FIGS. 3 and 4.

Figure 3:
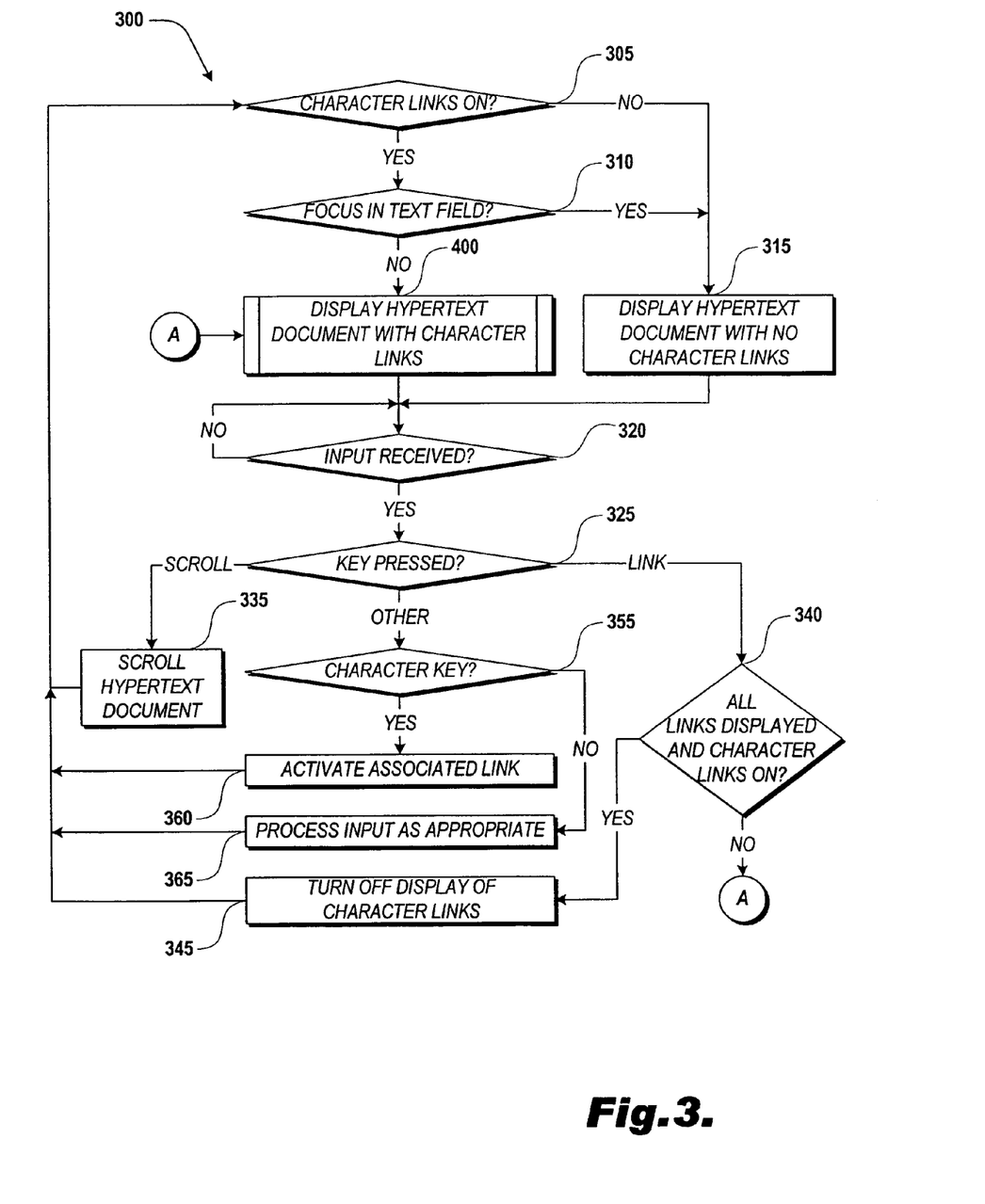
FIG. 3 is a flow diagram illustrating a routine for link numbering in accordance with the present invention.

FIG. 3 is a flow chart illustrating actions of one exemplary embodiment of the present invention where links within a hypertext document are dynamically associated with selectable characters, and wherein the character association is displayed with the links. The link handling routine 300 shown in FIG. 3 begins at the decision block 305 where determination is made whether character links are turned on (e.g., are to be displayed) in the current GUI. If so, then processing continues to decision block 310 where a further determination is made whether the current "focus" (e.g., placement of the current cursor or GUI selected element) is in a text field. If so, then processing continues to block 315. Similarly, if in decision block 305 it was determined that character links were not turned on in the current GUI, then processing would also continue to block 315 where a hypertext document is displayed with no character links.

Figure 4:
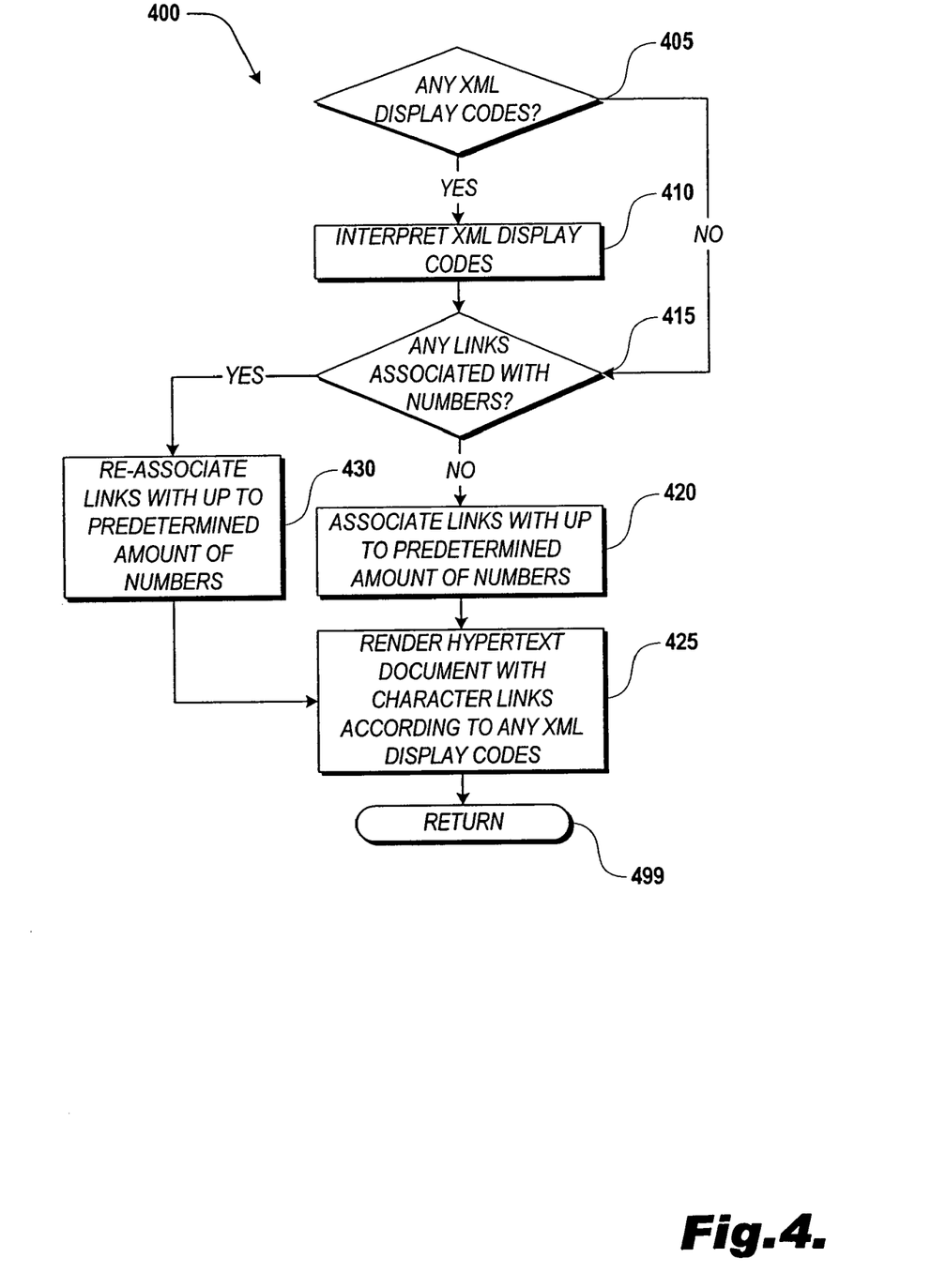
FIG. 4 is a flow diagram illustrating a hypertext display subroutine suitable for use in the routing illustrated in FIG. 3.

If, however, in decision block 310 it was determined that the focus of the current GUI is not in a text field, then processing continues to subroutine block 400 where the hypertext document is displayed with character links. Subroutine 400 is illustrated in FIG. 4 and described in greater detail below. Processing then continues to decision block 320 which waits until an input is received.

Once an input has been determined to have been received in decision block 320, then processing continues to decision block 325 where a determination is made as to the type of input received. If a scroll key 215 was pressed, then processing continues to block 335 where the hypertext document is scrolled. Next, processing continues back to decision block 305.

If, however, in decision block 325 is was determined that the key pressed was the dynamic link key 220, then processing continues to decision block 340. In decision block 340, a determination is made whether all links in the display (e.g., phone display 210 or computing device display 140) have been displayed and that character links were turned on then in block 345 the display of character links is turned off and processing proceeds back to decision block 305.

If, however, in decision block 340 it was determined that all links have not been displayed or that the character links are not turned on, then processing continues back to subroutine block 400.

Returning to decision block 325, if some other key has been pressed, then processing continues to decision block 355 where a determination is made whether a character key associated with a link was pressed; in which case processing continues to block 360 where the associated link is automatically activated. If, however, on decision block 355 it was determined that some other key other than a character key was pressed as input, then processing continues to block 365 where the input is processed as appropriate. After processing continues to either block 360 or 365, then routine 300 proceeds back to decision block 305.

FIG. 4 illustrates an exemplary hypertext document display subroutine 400 having character links. The hypertext document display subroutine 400 begins at decision block 405 where a determination is made whether any XML display codes are included in the hypertext document that affect the display of character indicators for the character links. If so, then processing continues to block 410 where the XML display codes (or other conventional embedded codes within a GUI display description) are interpreted. Processing then continues to decision block 415. Similarly, if no XML display codes are found in decision block 405, then processing also continues to decision block 415.

In decision block 415, a determination is made whether there are any links in the hypertext document that are already associated with characters. If so, then processing continues to block 430 where the links are dynamically re-associated with up to a predetermined number (e.g., nine characters if numeric characters "1-9" are used) of characters. Those of ordinary skill in the art and others will appreciate that the number of links to associate with characters will often correspond generally to the number of characters available to a user when operating some form of input device (e.g., keyboard, touch pad, touch screen, etc.). Processing then continues to block 425. If in decision block 415 it was determined that no links are associated with characters, then in block 420 any links in the current display are dynamically associated (e.g., as the display is updated on the device) with up to the predetermined number of characters. Processing then continues to block 425.

In block 425, the hypertext document (or other GUI with selectable elements) is rendered with character links. The character links are rendered according to default display characteristics or in the case where XML display codes were received and interpreted according to the XML display codes which may effect the size, font, color, transparency, position or other display characteristics of the characters that are approximate to the links in the hypertext document. In most cases the character links (bubble links) are displayed next to or at least proximate to their respective associated links (or selectable elements). Subroutine 400 then returns to its calling routine at block 499.

Figure 5A:
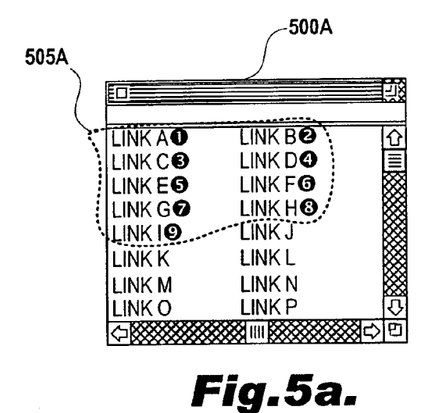
FIGS. 5a-5d are exemplary screen shots of a browser display having numbered links formed in accordance with the present invention.
Figure 5B:
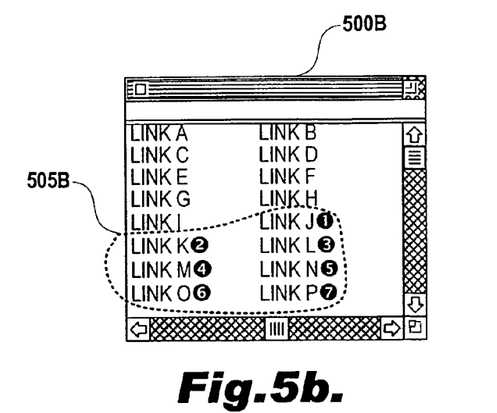

FIGS. 5*a-d* and FIG. 6 illustrate exemplary screen shots of graphical user interfaces with characters associated with selectable elements. FIGS. 5*a* and 5*b* illustrate GUIs where a browser 500A-B includes a plurality of links with associated characters 505A-B. In FIG. 5*a*, the browser 500A includes links "A-I" that have associated numeric characters "1-9" displayed jointly as character links 505A. As noted earlier with regard to the processes illustrated in routine 300 and subroutine 400 above, a user may designate a new set of links to associate with characters. Accordingly, in FIG. 5b links "J-P" are associated with numeric characters "1-7" to form character links 505B which would result from a user toggling the next set of links to be re-associated with character, e.g., by selecting the dynamic link key 220 on an exemplary cellular phone device 200 illustrated in FIG. 2.

Figure 5C:
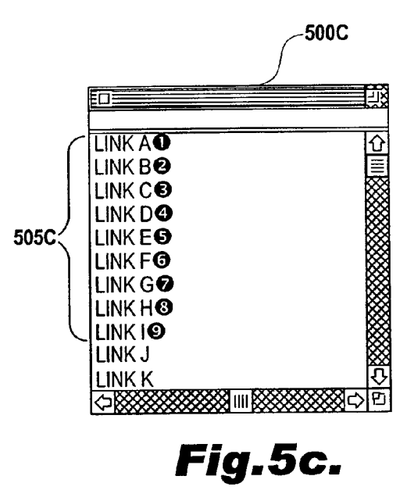
Figure 5D:
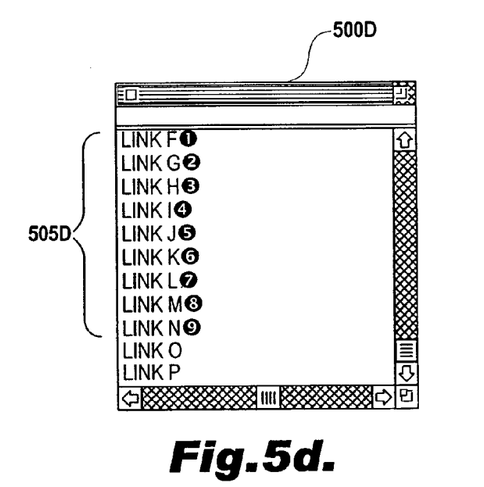

FIGS. 5c and 5d illustrate similar re-association generated by a user scrolling through a display of links in a browser. FIG. 5c illustrates links "A-I" associated with numeric characters "1-9" to form character links 505C. FIG. 5d illustrates the browser 500D after the user has selected a scroll button (e.g., scroll button 215) and has scrolled the browser 500D down to display links "F-N". Accordingly, the links were dynamically re-associated such that only the visible links are associated with characters. Therefore, links "F-N" are associated with numeric characters "1-9" to have character links 505D.

Figure 6:
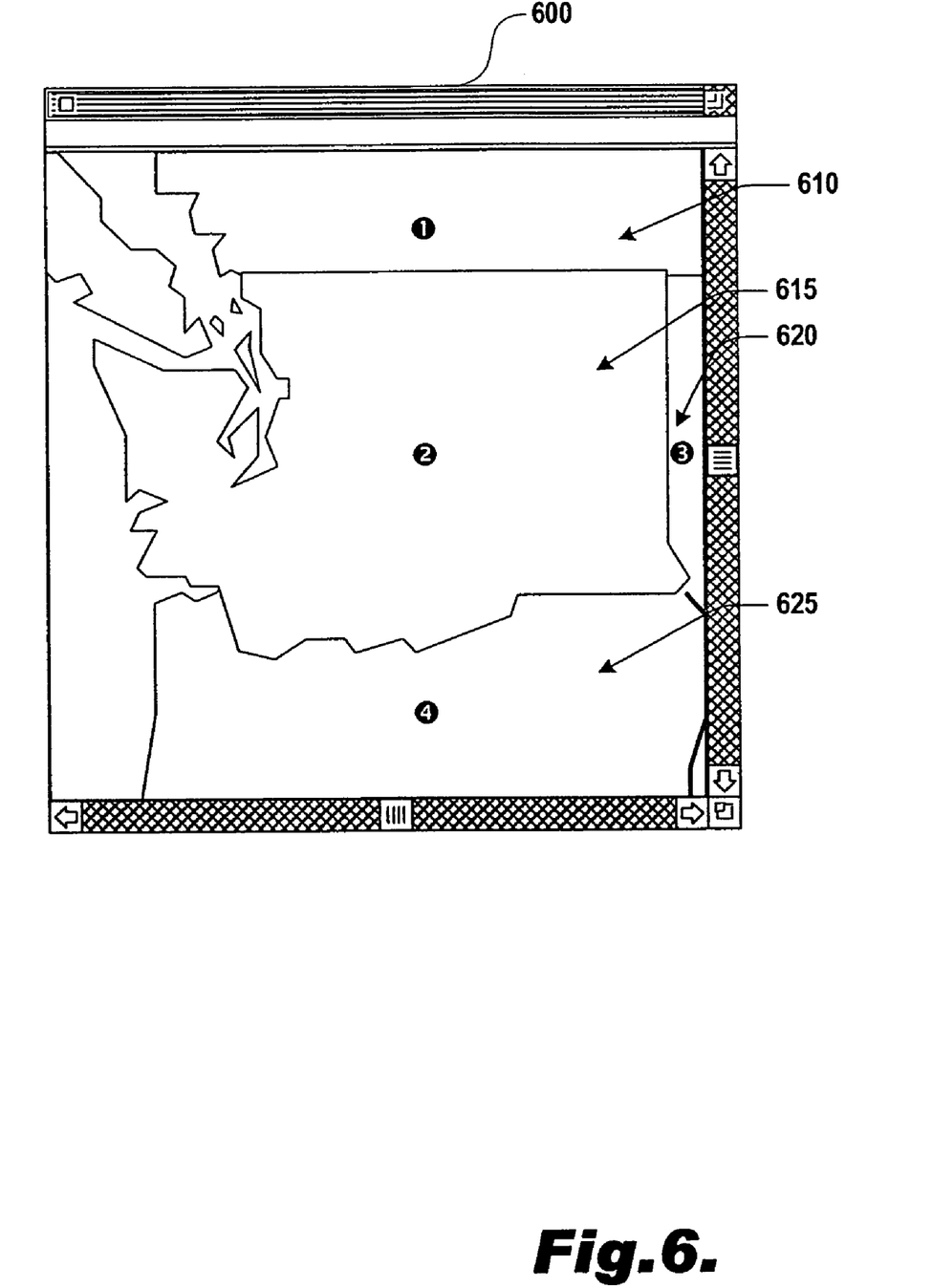
FIG. 6 is an exemplary screen shot of a browser display having numbered links on an image map formed in accordance with the present invention.

FIG. 6 illustrates a further embodiment of the present invention with non-textual links associated with characters. Accordingly, in the browser 600 shown in FIG. 6, there is an "image map" displayed with four regions 610, 615, 620 and 625 that each have a numeric character "1-4" associated with the selectable link region. Actuating a numeric key from "1-4" would have the same effect as a pointing device activating one of the link regions region 610, 615, 620 or 625 in the browser 600.

While the presently preferred embodiment of the invention has been illustrated and described, it will be appreciated that various changes can be made therein without departing from the spirit and scope of the invention as defined by the appended claims. In particular, while the exemplary embodiments of the present invention have been described with regard to hypertext documents within a browser, those of ordinary skill in the art will appreciate that many other GUIs having displayed selectable elements are suitable for use with the present invention.

The invention claimed is:

1. A method comprising:
receiving, by a computing device, a document including a form field and a hypertext link;
determining, by the computing device, whether the link will be visible to a user of the computing device when the document is first displayed to the user;
if the link is determined to be visible, dynamically associating, by the computing device, a distinct character with the link;
displaying, by the computing device, the document in a display of the computing device with the distinct character depicted proximately to the link;
receiving, by the computing device, input from the user; and
if the input is a selection by the user of the form field, hiding the display of the distinct character.

2. The method of claim 1 wherein the distinct character is one of a numeric digit, an alphanumeric character, a phone key pad character, a computer keyboard character, and a stylus-generated character.

3. The method of claim 1 wherein the received input is a scrolling input, and the method further comprises:
determining whether any second links will be visible to the user after the scrolling input;
dynamically reassociating the distinct character with a second link; and
displaying the distinct character proximate to the second link.

4. The method of claim 1 further comprising:
receiving a reassociation request; and
in response to receiving the reassociation request, reassociating the distinct character with a second link, the second link having been determined to be visible to the user.

5. The method of claim 1 wherein the document includes additional instructions regarding the distinct character.

6. The method of claim 5 wherein said additional instructions are directed to the association of the distinct character with the link.

7. The method of claim 6 wherein said additional instructions are directed to display characteristics of the distinct character.

8. The method of claim 1 wherein the form field is associated with a second distinct character, and the form field is selected by the user by activating a key or button corresponding to the second distinct character.

9. The method of claim 1 wherein the link is one of a text link, an image link, a hidden link, or an image map link.

10. The method of claim 1 further comprising toggling the display of the distinct character.

11. The method of claim 1, wherein the distinct character corresponds to a key or button of the computing device, and the method further comprises:
receiving an activation of the key or button by the user; and
in response, automatically activating the link.

12. A mobile device comprising;
a processor;
a plurality of keys or buttons coupled to the processor; and
logic communicatively coupled to the keys or buttons and the processor, the logic to be operated by the processor to
receive a document including one or more hypertext links,
determine whether the links will be visible to a user of the mobile device when the document is first displayed to the user,
if the links are determined to be visible, dynamically associate distinct characters with ones of the visible links, each distinct character corresponding to one of the keys or buttons,
display the document in a display of the mobile device with the distinct characters depicted proximately to the ones of the visible links, and
if input is received from the user that is a selection by the user of a form field of the document, hide the display of the distinct characters.

13. The apparatus of claim 12, wherein the logic is further to receive an activation of one of the keys or buttons by the user, and, in response, if the activated key or button corresponds to one of the distinct characters, automatically activate the link associated with that distinct character.

14. The apparatus of claim 12, wherein the mobile device further comprises a scrolling button coupled to the processor, and the logic is further to
receive input from the scrolling button,
determine whether any second links will be visible to the user after the scrolling input,
dynamically reassociate the distinct characters with ones of the visible second links, and
display the distinct characters proximate to the ones of the visible second links.

15. The apparatus of claim 12, wherein the mobile device further comprises a dynamic link key coupled to the processor, and one or more of the visible links are not associated with any of the distinct characters and the logic is further to receive a reassociation request via an activation by the user of the dynamic link key, and reassociate, in response to receiving the reassociation request, at least some of the distinct characters with the one or more visible links.

16. An article of manufacture comprising:

a storage medium; and a plurality of programming instructions stored on the storage medium and configured to program a mobile device to receive a document including one or more hypertext links, determine whether the links will be visible to a user of the mobile device when the document is first displayed to the user, if the links are determined to be visible, dynamically associate distinct characters with a first portion of the visible links, each distinct character corresponding to a key or button of the mobile device, display the document in a display of the mobile device with the distinct characters depicted proximately to the ones of the visible links, receive a reassociation request via an activation by the user of a dynamic link key of the mobile device, reassociate, in response to receiving the reassociation request, at least some of the distinct characters with a second portion of the visible links, the second portion including different visible links than the first portion, and receive input from the user, wherein if the input is a selection by the user of a form field of the document, hide the display of the distinct characters.

17. The article of claim 16, wherein the programming instructions are further configured to receive an activation of the key or button by the user, and, in response, to automatically activate the link.

18. The article of claim 16, wherein the programming instructions are further to receive input from a scrolling button of the mobile device, determine whether any second links will be visible to the user after the scrolling input, dynamically reassociate the distinct characters with ones of the visible second links, and display the distinct characters proximate to the ones of the visible second links.

* * * * *